United States Patent [19]

Brachmann et al.

[11] 4,418,173

[45] Nov. 29, 1983

[54] VULCANIZABLE RUBBER MIXTURE AND VULCANIZING PROCESS FOR SUCH A RUBBER MIXTURE

[75] Inventors: Walter Brachmann, Nonnenhorn; Horst Kornau; Klaus Thiel, both of Lindau, all of Fed. Rep. of Germany

[73] Assignee: Metzeler Kautschuk GmbH, Munich, Fed. Rep. of Germany

[21] Appl. No.: 268,096

[22] Filed: May 27, 1981

[30] Foreign Application Priority Data

May 31, 1980 [DE] Fed. Rep. of Germany ....... 3020746

[51] Int. Cl.$^3$ .......................... C08K 3/22; C08L 9/02; C08L 9/06; C08L 61/10
[52] U.S. Cl. ................................... 524/425; 524/432; 525/139; 525/194; 525/195; 525/196; 525/232; 525/233
[58] Field of Search ............... 524/432, 511, 521, 525, 524/526; 525/139, 219, 133, 232, 233, 194, 195, 196

[56] References Cited

U.S. PATENT DOCUMENTS

| | | | |
|---|---|---|---|
| 3,250,733 | 5/1966 | Giller | 525/133 |
| 3,725,330 | 4/1973 | Shirato et al. | 525/219 |
| 3,944,510 | 3/1976 | Bowers et al. | 524/511 |
| 4,014,827 | 3/1977 | Hart et al. | 525/133 |
| 4,160,759 | 7/1979 | Gardner et al. | 524/432 |

FOREIGN PATENT DOCUMENTS

| | | | |
|---|---|---|---|
| 1591722 | 6/1970 | France | 525/133 |
| 55-66938 | 5/1980 | Japan | 525/133 |
| 1073851 | 6/1967 | United Kingdom | 525/133 |

*Primary Examiner*—Allan Lieberman
*Attorney, Agent, or Firm*—Herbert L. Lerner; Laurence A. Greenberg

[57] ABSTRACT

A vulcanizable rubber mixture which will give the desired properties of leather-hard rubber and can also be extruded with a mixture which gives soft rubber. The composite profile from the extrusion has an area of leather-hard rubber and an area of soft rubber. The composite profile is heated by hot air and/or uhf radiation to 180° to 280° C. and the vulcanized profile cooled very rapidly to 10° to 50° C.

5 Claims, 2 Drawing Figures

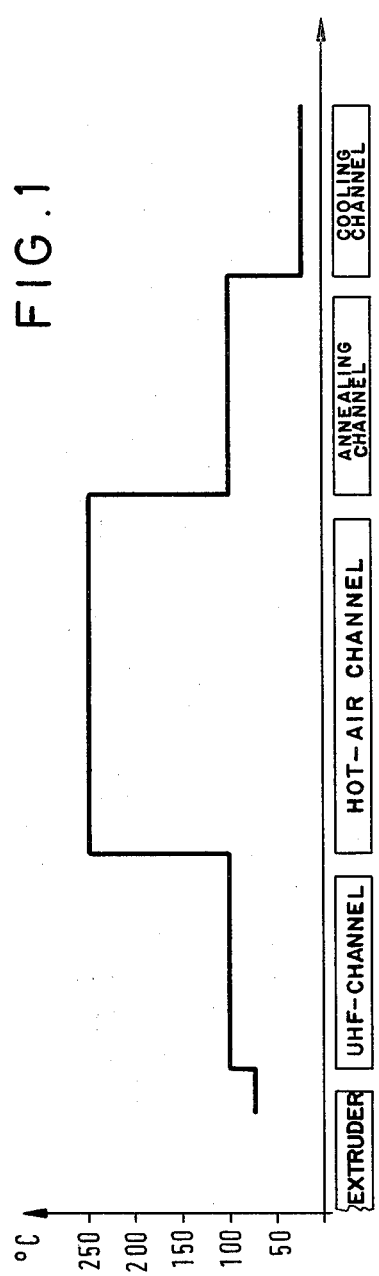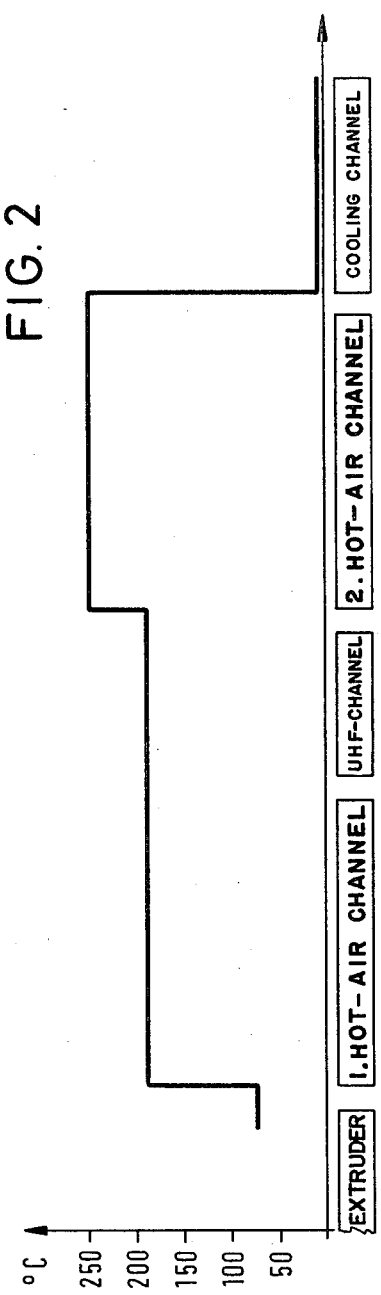

VULCANIZABLE RUBBER MIXTURE AND VULCANIZING PROCESS FOR SUCH A RUBBER MIXTURE

BACKGROUND OF THE INVENTION

1. Field of the Invention

The invention relates to a vulcanizable rubber mixture for fabricating an area of leather-hard rubber for a composite profile of leather-hard rubber/soft rubber, as well as to a vulcanizing process for such a mixture.

2. Description of the Prior Art

A composite profile known from German Petty Patent No. 7 510 829 is produced by joint extrusion and vulcanization of two different grades of rubber. This composite profile has an area of so-called "leather-hard rubber" and a second area, developed integrally therewith of ordinary soft, rubber-elastic rubber.

This "leather-hard rubber" represents a transition region between the ordinary soft rubber and the hard rubber and is generally considered "unusable". While its Shore-D-hardness is around 40 to 60 and, in particular, 50, and therefore corresponds to the hardness of hard rubber, its tensile strength is considerably lower than that of hard rubber and is approximately in the range of 50 to 250 kg per cm$^2$. Its elongation is 30 to 60% and, in particular, about 35 to 40%.

This leather-hard rubber is therefore an elastically deformable material with relatively great hardness.

The advantage of such a composite profile is that the area of leather-hard rubber has approximately the same properties as sections of soft rubber customary heretofore, which were provided with steel reinforcement. This leather-hard rubber, therefore, furnishes relatively large clamping forces for fixing such a section.

While the soft rubber used for this composite profile can be produced from the customary mixtures, special mixtures are required for the leather-hard rubber, which mixtures lead to the desired properties of the area of leather-hard rubber and also can be extruded and vulcanized together with the soft rubber.

However, no rubber mixture known to date meets these requirements.

SUMMARY OF THE INVENTION

It is, therefore, an object of the present invention to provide a vulcanizable rubber mixture which will give the desired properties of the leather-hard rubber, and a vulcanizing process for such a rubber mixture which can be extruded and vulcanized together with another rubber mixture which leads to soft rubber.

With the foregoing and other objects in view, there is provided in accordance with the invention a vulcanizable rubber mixture for producing an area of leather-hard rubber for a composite profile of leather-hard rubber/soft rubber, comprising (a) 100 parts by weight of polymer base,
(b) 12 to 40 parts by weight of sulfur,
(c) 4 to 15 parts by weight reinforcement resin,
(d) 3 to 4 parts by weight accelerator,
(e) 7 to 15 parts by weight zinc oxide.

In accordance with the invention, there is provided a process of producing a composite profile by joint extrusion and vulcanization of two different grades of rubber in which the composite profile has an area of leather-hard rubber and a second area of soft elastic rubber, the combination therewith of (A) employing a vulcanizable rubber mixture for producing an area of leather-hard rubber for a composite profile of leather-hard rubber/soft rubber, comprising
 (a) 100 parts by weight of polymer base,
 (b) 12 to 40 parts by weight of sulfur,
 (c) 4 to 15 parts by weight reinforcement resin,
 (d) 3 to 4 parts by weight accelerator,
 (e) 7 to 15 parts by weight zinc oxide, and
(B) heating the composite profile in the vulcanization thereof by hot air to 180° to 280° C., and rapidly cooling the vulcanized composite profile to 10° to 50° C.

Other features which are considered as characteristic for the invention are set forth in the appended claims.

Although the invention is illustrated and described herein as embodied in a vulcanizable rubber mixture and vulcanizing process for such a rubber mixture, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 schematically illustrates a temperature profile for extruding a rubber mixture in accordance with the invention together with a rubber mixture for soft rubber and then vulcanizing the composite profile of the two rubber mixes by subjecting the composite profile to ultra high frequency, hot air, annealing, and rapid cooling, FIG. 2 is a modified form of vulcanizing the composite profile by hot air, ultra high frequency, hot air, and cooling by a sharp drop in temperature.

DETAILED DESCRIPTION OF THE INVENTION

A rubber mixture which will give the desired properties of leather-hard rubber and also can be extruded and vulcanized together with soft rubber is achieved by the following components:

(a) 100 parts of polymer base,
(b) 12 to 40 parts sulfur
(c) 4 to 15 parts reinforcement resin,
(d) 3 to 4 parts accelerator,
(e) 7 to 15 parts zinc oxide.

A vulcanizing process for such a rubber mixture is distinguished by the feature that the composite profiles heated by hot air and/or uhf radiation to 180° to 280° C. are cooled down very rapidly to 10° to 50° C.

This rubber mixture can be extruded and subsequently vulcanized together with the rubber mixture providing the soft rubber. A firm bond is formed between these two rubber grades and therefore a practically integral composite profile is obtained. It is essential in this connection that the vulcanization be broken off suddenly, i.e. the composite profiles are cooled off so fast that post-vulcanization cannot come about. Quenching by immersion in a liquid is usually adequate but rapid cooling by placing in a very cold zone is also effective.

Vulcanization by hot air and/or uhf radiation has the advantage that the composite profiles, which are still deformable in this state, can be handled more easily.

Although, for example, natural rubber, polyisoprene, rubber, styrene butadiene rubber can be used as the polymer base individually or in combination, polybutadiene rubber and acrylonitrile butadiene rubber are the preferred materials. The ratio of these two materials can be varied in the range 1:3 to 3:1. The preferred ratio is, however, 50 parts by weight polybutadiene rubber and 50 parts by weight acrylonitrile butadiene rubber.

The acrylonitrile content of the acrylonitrile butadiene rubber desirably is about 18 to 38% by weight and, preferably, about 33%.

The use of a suitable accelerator which, if uhf radiation is used, leads to heavy overvulcanization and, therefore, to the production of the leather-hard rubber, is important for the rapid and complete execution of the vulcanization process. Very good results were obtained with a mercapto-thiuram accelerator. For cost reasons, chalk can also be added to the rubber compound in an amount of 10 to 50 parts by weight, preferably 20 parts.

The invention will be explained in further detail in the following with the aid of an embodiment example, referring to the attached schematic drawings, which show a temperature profile for two different vulcanizing systems.

One preferred embodiment of a rubber mixture according to the invention contains the following components:

27 parts sulfur,
50 parts polybutadiene rubber,
50 parts acrylonitrile butadiene rubber with an acrylonitrile content of 33%,
7 parts reinforcement resin, and specifically phenol-formaldehyde resin and/or styrene butadiene polymerisate resin,
1.0 part dibenzothiazyldisulfide (MBTS) as mercapto accelerator,
3.7 parts tetramethylthiuram monosulfide as thiuram accelerator,
10 parts zinc oxide,
20 parts chalk.

This rubber mixture was extruded together with the rubber mixture for the soft rubber and was then vulcanized as a composite profile. The temperature profile of the two vulcanizing lines used for this process as shown in FIGS. 1 and 2.

In the vulcanizing line according to FIG. 1, the composite profile is first heated by uhf (ultrahigh frequency) irradiation to approximately 100° C. and subsequently by hot air to about 250° C. Adjacent to this heating zone is an annealing zone in which the temperature is kept at about 100° C. Subsequently, the composite profile is cooled down suddenly by immersion into a water bath to about 25° C.

In the second vulcanizing line, the extruded composite profile is heated by uhf radiation and hot air to about 200° C.; then, further heating by hot air to about 250° C. follows. These heating zones are followed by a cooling section in which a temperature of about minus 5° C. to 0° prevails. In this cooling section, the composite profile is cooled down suddenly to about 40° C.

We claim:

1. Vulcanizable rubber mixture for producing an area of leather-hard rubber for a composite profile of leather-hard rubber/soft rubber, consisting essentially of
   (a) 100 parts by weight of a rubber selected from the group consisting of natural rubber, polyisoprene rubber, styrene butadiene rubber, polybutadiene rubber, and acrylonitrile butadiene rubber and mixtures thereof,
   (b) 12 to 40 parts by weight of sulfur,
   (c) 4 to 15 parts by weight reinforcement resin, selected from the group consisting of phenol-formaldehyde resin and styrene butadiene polimerisate resin
   (d) 3 to 4 parts by weight accelerator
   (e) 7 to 15 parts by weight zinc oxide, said composite profile in the vulcanization thereof heated by hot air to 180°-280° C. and rapidly cooling the vulcanized composite product to 10°-50° C. yields a shore D hardness for the leather-hard rubber.

2. Rubber mixture according to claim 1, wherein the rubber consists of about 50 parts by weight polybutadiene rubber and about 50 parts by weight acrylonitrile butadiene rubber, and wherein the acrylonitrile butadiene rubber has an acrylonitrile content of 18 to 38% by weight.

3. Rubber mixture according to claim 1, wherein the amount of such reinforcement resin is about 7 parts by weight.

4. Rubber mixture according to claim 1, wherein the accelerator is 0.75 to 1.2 parts by weight dibenzothiazyl disulfide and 2.88 to 3.25 parts by weight tetramethylthiurammonosulfide.

5. Rubber mixture according to claim 1, wherein 10 to 50 parts by weight chalk are added to the rubber mixture.

* * * * *